United States Patent Office 3,435,713
Patented Apr. 1, 1969

3,435,713
AUTOMATIC CHANGE SPEED TRANSMISSION
Erwin Pfisterer and Siegfried Strohm, Stuttgart-Stammheim, Germany, assignors to Firma Dr. Ing. h.c.F. Porsche KG, Stuttgart-Zuffenhausen, Germany
Filed July 25, 1967, Ser. No. 655,890
Claims priority, application Germany, Aug. 4, 1966, P 40,124
Int. Cl. G05g 21/00
U.S. Cl. 74—866   14 Claims

ABSTRACT OF THE DISCLOSURE

A change speed gear arrangement for vehicles, particularly passenger motor vehicles, having an automatic electrical circuit for providing electrical shifting signals in dependence upon the vehicle speed and the engine load, wherein the electrical signal actuates a reversible motor for moving the control slide valve of a hydraulic circuit that changes the gear ratios. The automatic operation is manually over-ridable.

Background of the invention

In known shifting arrangement, the gear changes are accomplished by means of electromagnets that operate in dependence upon one or several operating values of the vehicle and in turn actuate hydraulic slides for controlling the flow of pressurized fluids to the individual shifting plungers of the hydraulically actuated change speed gear. Shifting of gears by means of electromagnets is disadvantageous in that complicated and expensive provisions are required to accurately accomplish the shift steps and to hold the shifted position. Therefore, balanced step shift devices with electromagnetically released locking devices are required for these types of known shifting arrangements, which are quite expensive. Furthermore, if one of the control circuits is out of action, there is no possibility for manually over-riding the shifting slides.

Also, there is known a shifting arrangement wherein a shifting rod directly engages a multi-step change speed gear and may be automatically operated by means of a hand lever and a plurality of hydraulic servo motors. An electric shifting device is provided, which is dependent upon various pick-up values, to operate a row of electromagnets by which the control slides for the gear selection and shifting are correspondingly actuated. Since the electromagnets are directly connected with the shifting slides, the step-shifting mechanism is avoided but instead magnetic switches, operating independently from each other, must be provided for each shift step, that is, from the initiation to the completion of the shifting process, which again is very expensive. Furthermore, the arrangement is prone to breakdowns as a result of the plurality of switches and slides.

Summary of the invention

It is an object of the present invention to provide a satisfactory shifting arrangement dependent upon several values of engine operation and vehicle operation, which may be manually overridable and is inexpensive.

In contrast to the above mentioned known devices, the present invention avoids the undesirable electromagnets and provides only a small number of operatively reliable shifting elements for the gear shifting.

According to the present invention, an electrical signal dependent upon engine and vehicle operation controls the operation of an electric reversible motor that in turn controls the position of a follower-shifting device that engages the gear selector slide valve of the hydraulic gear change circuit, which is manually overridable by means of an adjusting linkage combined with a gear selector lever. The follower-shifting device is extremely reliable, as tests have proven, and is controlled by a resistance feedback so that the reversible motor is driven until its effective current drops to zero. With such a device, the individual positions of the gear selector slides of the hydraulic circuit are executed without complicated provisions, in an exact manner and dependent upon the operating values of the vehicle. Inaccuracies in the shifting arrangement are further avoided by connecting the follower-shifting device with a reversible motor by means of an adjustable coaxial connecting rod and a direct connection to the hydraulic slide valve. Also, with such an arrangement, the required power is at a minimum.

Advantageously, the connecting rod is operated by means of a threaded spindle driven directly by the motor shaft and is provided with a sliding variable resistance determining loop for adjusting the travel in dependent upon the control voltage. The current rail and balancing resistance associated with the sliding loop extend equal distance from each other and parallel to the axis of the connecting rod. Mounting plates are provided at the opposite ends for holding the current rail and balancing resistance, while at the same time preventing rotation of the connecting rod so that a compact, simple and easily replaceable unit is obtained. Replaceability and ease in manufacturing are further enhanced by placing the reversible motor and the follower-shifting device in a common housing, which is connectable as a single assembly with the gear housing containing the hydraulic servo elements.

To provide for manual overriding of the automatic operation, the present invention provides a spring urged axial abutment driving relationship between the connecting rod and the gear selector slide valve, with the spring bias being in opposition to the direction of shifting speed increase and the slide valve being operatively connected with the gear selector lever. The manually overridable adjusting linkage has relatively few elements, which consist essentially of a floating lever connected directly to the slide valve and connected to the selector lever by means of a single intermediate link. Also, the gear selector lever is provided with a switch controlling operation of the electrical shifting arrangement to interrupt the circuit and provide for the return of the connecting rod to its original position, which is quite simple and reliable.

Brief description of the drawing

Further objects, features and advantages of the present invention will become more clear from the following detailed description of the drawing, wherein.

Detailed description

Figure 1:
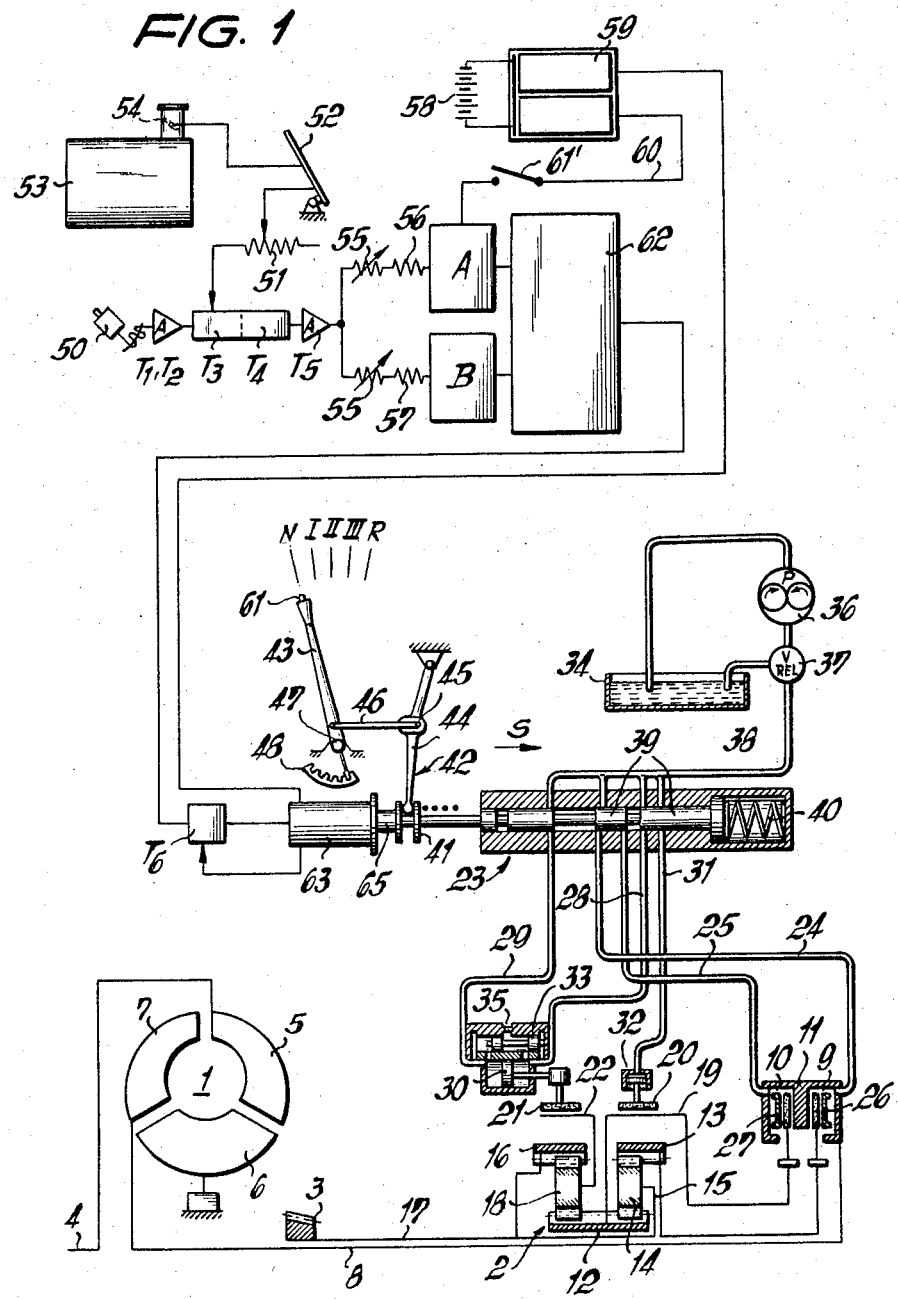
FIGURE 1 is a somewhat schematical diagram of a hydrodynamic compound gear arrangement for a motor vehicle, with the electro-hydraulic automatic shifting control of the present invention.

In FIGURE 1, only one symmetrical schematic portion of the compound gear arrangement is shown, for purposes of simplicity. A torque converter 1 is operatively connected to the planetary gear arrangement 2 and the differential gear arrangement 3 for driving the rear wheels of the vehicles, for example. The torque converter 1 is driven by means of the engine crankshaft 4 that is directly drivingly connected to the pump impeller 5. The guide wheel 6 is provided with a free wheeling support and the turbine wheel 7 is drivingly directly connected with the drive shaft of the planetary gear arrangement 2. Friction disk clutches 9 and 10 include a drum drivingly connected to the drive shaft 8. The friction clutches 9 and 10 are operable to determine the three forward and one reverse gear connections for the planetary gear arrangement 2.

The planetary gear arrangement 2 has two substantially identical planet gear sets with a common sun gear 12. The ring gear 13 of the first planetary gear set is drivingly connected to the friction disk of the friction clutch 9. The planet gears 14 are supported by means of the planet carrier 15 in toothed engagement between the ring gear 13 and sun gear 12. The cage support 15 is directly drivingly connected with the ring gear 16 of the second planetary gear set and in direct driving engagement with the output shaft 17. The planet gears 18 of the second planetary gear set are in toothed engagement between the sun gear 12 and the ring gear 16. The sun gear 12 is directly drivingly connected with the friction disk of the friction clutch 10 through the intermediary of the brake drum 19. The brake drum 19 serves to lock the sun gear through cooperation with the simple band brake 20. A double acting band brake 21 will likewise lock the planet carrier 22 of the planet gears 18 in the second planetary gear set.

The hydraulic portion of the shifting arrangement for the above-mentioned gearing includes a gear selector slide valve 23 that has pressure lines 24, 25 operably connected with the pressure pistons 26, 27 of the friction clutches 9, 10, respectively. Also, pressure lines 28, 29 are operatively connected with the double acting piston 30 that actuates the band brake 21. A further pressure line 31 is operatively connected with the pressure piston 32 of the band brake 20. A venting valve 33, including a throttle 35 leading to the reservoir, is associated with the fluid control of the piston 30. The remaining piston operated servo elements of the clutches 9, 10 and the band brake 20 are each provided with similarly constructed venting devices so that during change of gears, the engagement of the friction elements is accomplished in dependence upon the venting time of the servo elements to be disconnected for smooth operation.

Pressurized fluid is supplied from the fluid reservoir 34 by means of a pump, for example a gear pump, that is preferably driven by the internal combustion engine. The output of the pump 36 is connected to the pressure regulator 37 and in turn through a branched pressure lead conduit 38 to the gear selector slide valve 23. The conduit 38 branches off a head of the gear selector slide valve according to the position of the individual control shoulders or spools 39 of the slide valve.

The moveable valve portion having the spools 39 thereon move in the speed increasing shift direction indicated by arrow S against the bias of coil spring 40 and has the shifting collar 41 in engagement with the shifting linkage 42. The shifting linkage 42 includes the selector lever 43 that drives the freely pivotal shifting fork lever 44 having an elongated pin and slot connection with the intermediate connecting link 46. The intermediate connecting link 46 is pivotally connected to the selector lever 43 above the pivotal connection 47 of the selector lever. The selector lever 43 is provided with a step resting device or indexing mechanism 48 that will hold the selector lever 43 in the individual gear steps N (neutral), I, II, III as well as the reverse gear R.

The electrical portion of the shifting arrangement for automatic initiation of the gear shifting includes an inductive speed sensor or inductive revolution generator 50 that will produce an electrical signal correlated to the speed of the vehicle, for example which senses the impulse sequence of the passing output bevel gear 3 of the differential gear arrangement (not shown in detail). A pre-amplifier T1 and a limiter T2 receive the signal from the sensor 50. The impulse former transistor circuit T3 converts the signal from the sensor 50 into a control voltage. A load sensor 51 supplies a signal to the transistor circuit T3 that is proportional to the load of the vehicle and includes a potentiometer 51 operatively connected to the gas pedal 52 of the schematically illustrated internal combustion engine 53 that is provided with the conventional throttle valve 54 of the carburetor. Thus, the signal produced by the sensor 51 is proportional to the position of the throttle valve 54 and thus the load of the internal combustion engine. The transistor circuit T3 is connected to the transistor circuit T4 that integrates the signal corresponding to engine load and the signal corresponding to vehicle speed. The integrated output signal of transistor circuit T4 is supplied to the current amplifier T5. The transistor circuits T1–T5 consist of known structural elements with resistance and condenser groups sized according to the output voltage.

Trigger steps A and B are connected to the direct current amplifier T5. The trigger steps A and B are substantially identical construction, except that they will trigger or fire at different voltage levels. Each of the trigger steps A, B include a trimming potentiometer 55 which determines the difference between the respective speed increasing voltage trigger value and speed decreasing voltage trigger value. The trigger steps A, B will respond, that is trigger or fire, to the control voltage received from the amplifier T5 that corresponds to the appropriate shifting points, and are for this reason provided with correspondingly sized series resistances 56 and 57, which are different because the trigger step A will trigger one shift position while the trigger step B will trigger the other shift position or point.

The transistor groups of the trigger steps A and B, as well as the transistor circuits T1–T5, receive their electrical power from the vehicle battery 58, for example. In order to avoid fluctuations of the output of the battery 58, there is provided a voltage transformer 59, known per se, that is provided with transistors and the like for stabilization of the voltage to a value that is considerably lower than the battery voltage. For example, a 12 volt battery may be used in the delivery of voltage to the transistor circuits T1–T5 and trigger steps A, B, which may be stabilized at 7 volts, and conducted through line 60 that includes a switch 61 with contact 61'. The switch 61 is constructed as a push button switch on the top of the handle portion of the gear selector lever 43.

A voltage dividing resistance group 62 is connected to receive the output of the trigger steps A, B and in turn has an output connected to the transistor circuit T6 that controls the operation of the reversible motor 63 having the indicated feed back circuit to the transister circuit T6 to be described in more detail later. The control of the motor is accomplished through the individual resistances of the resistance group 62 and the balancing resistance 64 (FIGURES 2–4) of the motor feed back circuit, to determine the precise travel of the connecting rod 65. As shown in FIGURE 1, an excition voltage may be provided to the motor 63 directly from the transformer 59, which may be stabilized at 5 volts, for example.

Figure 2:
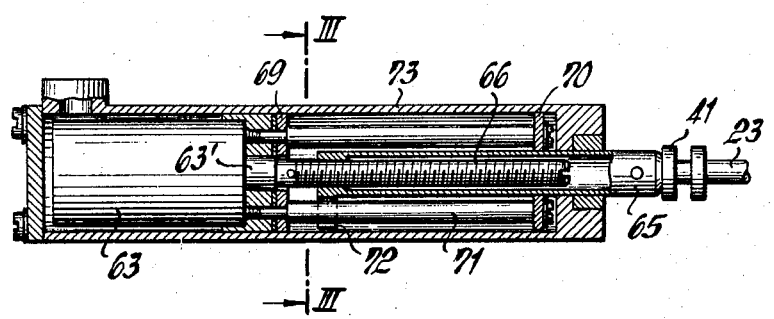
FIGURE 2 is a longitudinal cross sectional view through the electrical follower shifting device.
Figure 3:
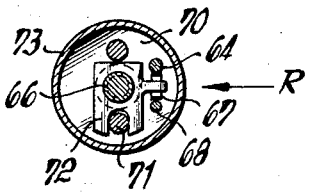
FIGURE 3 is a transverse cross sectional view taken on line III—III of FIGURE 2.
Figure 4:
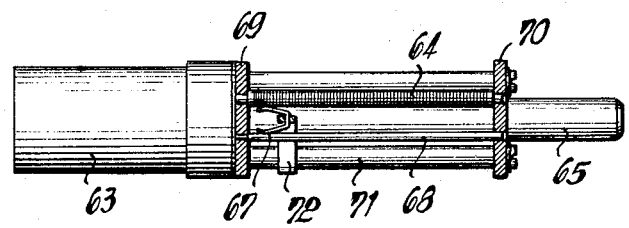
FIGURE 4 is a partial cross sectional view taken in the direction of arrow R of FIGURE 3.

As shown in FIGURES 2–4, the connecting rod 65 is hollow at its motor end and provided with internal threads drivingly engaged with the threaded spindles 66 that is directly connected to the motor shaft 63'. The connecting rod 65 carries an electrically isolated conductive loop 67 that provides a bridge between the balancing resistance 64 and the current rail 68. The current rail 68 and the balancing resistance 64 extend axially parallel with respect to each other and the connecting rod 65 between connections with the mounting plates 69 and 70. The mounting plates 69 and 70 are rigidly interconnected by means of a bar support 71 that slidably engages a fork-like lug 72 depending from the connecting rod 65 to prevent turning of the connecting rod 65. The axially relatively moveable members 65, 66, the current rail 68, the balancing resistance 64 and the reversible motor 63 are enclosed in a common housing 73, which may be connected to the housing containing the hydraulic shifting member of the change speed gear arrangement. The connection is such that the connecting rod 65 coaxially abuts with the shifting collar 41 of the gear selector slide valve 23.

*Operation*

If it is desired to provide automatic shifting from the neutral position N, as shown in the drawing, the gear selector lever 43 is moved into the position I and at the same time the push button switch 61 is operated so that the contact 61' is closed. With this movement of the selector lever 43, the gear selector slide valve 23 is driven by means of the linkage 42 into a position that opens the flow of pressurized fluid to the pressure lines 24, 29 so that the clutch 9 is engaged and the band brake 21 is tensioned to lock the planet gear carrier 22. Drive of the vehicle is thus through drive shaft 8, clutch 9, ring gear 13, planet gear 14, sun gear 12, planet gear 18, ring gear 16 and output shaft 17 of the planetary gear arrangement 2 in first gear. Also, by closing the shift contact 61', the transistor circuit train T1–T6 of the eletcrical shifting arrangement is simultaneously voltage-charged to actuate the connecting rod 65 of the follower device 65–68 to bring the gear selector slide valve 23 into the illustrated position, that is, the connecting rod 65 moves until the effective voltage on the motor 63 drops to zero because of the feed back voltage produced through the loop 67 and the balancing resistance 64.

If thereafter the speed of the vehicle is increased by means of the gas pedal 52, a voltage is built up by means of the sensor 51 and the sensor 50 receiving impulses from the passing output bevel gear 3 through the impulse former T3 and the transistor integration to the amplifier T5. When the ratio of both of these measured or sensed values reaches a specific level, the trigger step A responds and allows a voltage passage from the battery 58 to the resistor groups 62 and therewith to the balancing resistance 64; thus, an effective voltage is supplied to the motor 63. The reversible motor 63 responds and adjusts, through the threaded spindle 66, the connecting rod to move in the higher gear speed direction S until the effective current again falls to zero because of the feed back circuit. The connecting rod 65 thereby pushes the gear selector slide valve 23 to the right, with reference to FIGURE 1, until the pressure line 29 is closed and the pressure line 31 is opened. By gradual and controlled venting of the band brake 21 in dependence upon the throttle 35 and closing of the band brake 20, shifting to second gear is thereby accomplished without a noticeable jolt. The friction clutch 9 remains engaged. During this shifting process, the freely pivoted lever 44 of the linkage 42 is moved along without influencing the position of the gear selector lever 43, because of the lost motion connection 45.

The same working process automatically repeats itself when, by further acceleration of the vehicle, the gear arrangement is shifted into third gear. In this case, with the larger integrated control voltage, the trigger step B responds by which the resistance ratio between resistances 62 and the balance resistance 64 are changed in such a manner that the motor 63 is actuated by an effective voltage to move the connecting rod 65 for driving the gear selector slide 23 into a position in which, by opening the band brakes 20 and 21, driving of the vehicle is executed through the engaged friction clutches 9 and 10. Thus, the gear arrangement is in third gear. If while in this gear, the vehicle resistance increases which requires a down shifting of the gearing, the control voltage of the control circuit T1–T6 will modulate trigger step B and trigger step A will become effective so that the motor 63 will be reversed to bring the connecting rod 65 back until the position of second gear is reached. The gear selector slide 23 follows the movement of the connecting rod 65 under the action of the compression spring 40. The desired revolution span or voltage difference between the higher and lower shifting points is adjustable by means of the respective potentiometers 55 for the trigger steps A and B.

For manually operating the shifting arrangement, the push button switch 61 is operated so that the contact 61' opens. By opening of the contact 61', the electrical regulating circuit T1–T6 returns the elements to the starting position N by being de-energized with the simultaneous return of the connecting rod 65 so that all of the above described shifting positions can be accomplished manually with the gear selector lever 43. With the manual shifting movement, the freely pivotal lever 44 is moved through the intermediary of link 46 in the shifting direction S so that the gear selector slide valve 23 is moved to the right, as viewed in FIGURE 1, as in the case with the previously described automatic shifting process. During reverse shifting, the abutment between the gear selector slide valve 23 and the linkage is maintained by the compression spring 40. For shifting into reverse, the gear selector lever 43 is brought into the position R whereby the gear selector slide 23 opens pressure line 25 for actuating the friction clutch 10, and opens pressure line 29 to actuate the brake band 21. Vehicle drive is therefore accomplished to the rear wheels by means of the reverse rotation of the planetary gear arrangement 2 when in this reverse gear. The position of the reverse gear has been shown advantageously for purposes of illustration and it can easily be arranged in a practically more advantageous position, for example between the N-position and the position of the first gear I.

The above-preferred embodiment has been shown and described in detail for purposes of illustration and to illustrate some of the specific inventive features of the present invention although further modifications, variations and embodiments are contemplated within the spirit and scope of the following claims.

We claim:

1. A change speed gear shifting arrangement for vehicles, particularly motor vehicles, comprising: an internal combustion engine; a change speed gearing having a plurality of selectable gear ratios; an automatic gear shifting device including sensor means for delivering an integrated control electrical signal dependent upon the vehicle speed and internal combustion engine load; hydraulic means actuatable for selecting the gear ratios of said change speed gearing and including a selector slide moveable between fixed positions corresponding to the individual gear ratios, reversible electric motor means actuated by said integrated control electrical signal, and follower means driven by said reversible electric motor means for driving said selector slide between its fixed positions; and manual means for overriding said automatic gear shifting device and manually shifting said gearing into its gear ratios.

2. The device of claim 1, wherein said follower means includes a connecting rod coaxial with respect to the shaft of said motor means and drivingly directly connected to said gear selector slide.

3. The device of claim 2, wherein said follower device includes a threaded spindle directly driven by and coaxial with respect to the shaft of said motor means, and means engaged with said threaded spindle for producing a translation movement output; said follower device including feedback means driven by said threaded spindle for producing a feedback electrical signal proportional to the translation movement output combined in opposition with said integrated control electrical signal for regulating the actuation of said motor means.

4. The device of claim 3, wherein said feedback means includes a balance resistance extending substantially coaxial with respect to said threaded spindle, a current rail extending parallel and a slide contact driven by said threaded spindle between and electrically bridging said current rail and balance resistance; mounting plate means supporting said current rail and said balance resistance, and preventing rotation of said connecting rod.

5. The device of claim 4, including a common housing enclosing said motor means and said follower device; a gear housing containing said hydraulic means and said change speed gear; said common housing being connected rearwardly, with respect to the normal orientation of the vehicle, to said gear housing.

6. The device of claim 2, including a common housing enclosing said motor means and said follower device; a gear housing containing said hydraulic means and said change speed gear; said common housing being connected rearwardly, with respect to the normal orientation of the vehicle, to said gear housing.

7. The device of claim 1, wherein said follower device includes an axially shiftable connecting rod axially abutting with said gear selector slide; compression spring means biasing said connecting rod against the shifting direction for gear ratio increasing; said manual means engaging said gear selector slide between said spring means and said connecting rod.

8. The device of claim 7, wherein said manual means includes an adjusting linkage having a freely pivoted lever engageable at its free end with said gear selector slide, a gear selector lever, and an intermediate link drivingly and directly connected between said gear selector lever and said freely pivoted lever.

9. The device of claim 7, wherein said manual means includes a manual gear selector lever, and including switch means having a manual push button on said gear selector lever for interrupting the electrical signal from said sensor means to said motor means; and including means for returning said connecting rod to its neutral position upon said interruption.

10. The device of claim 8, including switch means having a manual push button on said gear selector lever for interrupting the electrical signal from said sensor means to said motor means; and including means for returning said connecting rod to its neutral position upon said interruption.

11. The device of claim 2, wherein said follower device includes an axially shiftable connecting rod axially abutting with said gear selector slide; compression spring means biasing said connecting rod against the shifting direction for gear ratio increasing; said manual means engaging said gear selector slide between said spring means and said connecting rod.

12. The device of claim 11, wherein said manual means includes an adjusting linkage having a freely pivoted lever engageable at its free end with said gear selector slide, a gear selector lever and an intermediate link drivingly and directly connected between said gear selector lever and said freely pivoted lever.

13. The device of claim 12, including switch means having a manual push button on said gear selector lever for interrupting the electrical signal from said sensor means to said motor means; and including means for returning said connecting rod to its neutral position upon said interruption.

14. The device of claim 11, wherein said manual means includes a manual gear selector lever, and including switch means having a manual push button on said gear selector lever for interrupting the electrical signal from said sensor means to said motor means; and including means for returning said connecting rod to its neutral position upon said interruption.

References Cited

UNITED STATES PATENTS

| | | | |
|---|---|---|---|
| 2,995,949 | 8/1961 | Gelenius et al. | 74—866 |
| 3,181,387 | 5/1965 | Baier et al. | 74—866 |
| 3,324,740 | 6/1967 | Lewis et al. | 74—866 |

ARTHUR T. McKEON, *Primary Examiner.*